US006929845B2

(12) United States Patent
Kai et al.

(10) Patent No.: US 6,929,845 B2
(45) Date of Patent: Aug. 16, 2005

(54) COATED PAPER FOR GRAVURE

(75) Inventors: Hidehiko Kai, Tokyo (JP); Koji Okomori, Tokyo (JP); Chizuru Wakai, Tokyo (JP); Hirokazu Morii, Tokyo (JP); Hideki Fujiwara, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 20 days.

(21) Appl. No.: 10/381,533

(22) PCT Filed: Sep. 27, 2001

(86) PCT No.: PCT/JP01/08422

§ 371 (c)(1),
(2), (4) Date: Sep. 22, 2003

(87) PCT Pub. No.: WO02/27095

PCT Pub. Date: Apr. 4, 2002

(65) Prior Publication Data

US 2004/0048087 A1 Mar. 11, 2004

(30) Foreign Application Priority Data

Sep. 27, 2000 (JP) ........................................ 2000-295293
Sep. 21, 2001 (JP) ........................................ 2001-289746

(51) Int. Cl.[7] .................................................. B32B 3/00
(52) U.S. Cl. ....................... 428/195; 428/199; 428/206; 428/537.5; 428/536
(58) Field of Search ................................ 428/195, 199, 428/206, 537.5, 536

(56) References Cited

U.S. PATENT DOCUMENTS

| | | | | |
|---|---|---|---|---|
| 4,867,844 A | * | 9/1989 | Dessauer | 162/135 |
| 5,120,365 A | | 6/1992 | Kogler | |
| 5,703,157 A | | 12/1997 | Fujiwara et al. | |
| 5,725,648 A | | 3/1998 | Brown et al. | |

FOREIGN PATENT DOCUMENTS

| | | | | |
|---|---|---|---|---|
| EP | 0 860 547 | A2 | | 8/1998 |
| EP | 0860547 | A2 | * | 8/1998 |
| EP | 1 023 498 | B1 | | 8/2000 |
| GB | 2 284 829 | A | | 6/1995 |
| JP | 06-212598 | | | 8/1994 |
| JP | 09-209297 | | | 8/1997 |
| JP | 11-012993 | | | 1/1999 |
| JP | 11-200283 | | | 7/1999 |
| JP | 11-200284 | | | 7/1999 |
| JP | 11-200285 | | | 7/1999 |
| JP | 11-279990 | | | 10/1999 |
| WO | WO 01/3122 | A1 | | 5/2001 |

* cited by examiner

*Primary Examiner*—Leszek B Kiliman
(74) *Attorney, Agent, or Firm*—Knobbe, Martens Olson & Bear LLP

(57) ABSTRACT

A coated paper for gravure printing that offers good gravure printability resulting from reduced missing dots while at the same time achieving high sheet gloss, wherein the paper comprises a base paper and a coating layer containing a pigment and an adhesive. This paper also contains a compound having an effect of inhibiting the binding between pulp fibers, wherein the compound, when added to 0.3 weight-part per 100 parts of bone-dry pulp, will reduce the tensile strength of the paper by five % to 40% (as measured in accordance with JIS P 8133).

13 Claims, No Drawings

COATED PAPER FOR GRAVURE

This application is the U.S. National Phase under 35 U.S.C. §371 of International Application PCT/JP01/08422, filed Sep. 27, 2001, which claims priority to Japanese Patent Application Nos. 2000-295293, filed Sep. 27, 2000, and 2001-289746, filed Sep. 21, 2001. The International Application was published under PCT Article 2 1(2) in a language other than English.

FIELD OF THE INVENTION

This invention relates to a coated paper for gravure printing that provides excellent sheet gloss and gravure printability.

BACKGROUND OF THE INVENTION

Gravure printing is a type of intaglio printing in which the ink within the grooves in a printing plate is pulled out and transferred onto paper under pressure. Because it offers excellent shading repeatability, gravure printing is used in commercial printing for the production of magazines, catalogues, brochures, and others. The metal-plate cylinders used in gravure printing are harder than those used in offset printing. However, if the surface of the cylinder doesn't adhere to the paper fully during printing, the ink will not transfer properly and white dots called "missing dots" will result. The generation of numerous missing dots leads to lower printing quality.

The use of a coated paper offering greater smoothness and cushioning is said to be an important factor in suppressing the generation of speckles. A smoother paper adheres more closely to the cylinder, while a higher degree of cushioning allows the paper to deform under printing pressure, thus ensuring better adhesion to the cylinder.

The addition of coating pigments having high aspect ratios (such as delaminated clay and talc) is considered effective as a means of achieving smoothness in a coated paper for gravure printing. However, adding large amounts of high-aspect-ratio pigments in the coating-layer composition increases the viscosity of the coating mixture, which in turn makes mixture preparation difficult. As a result, streaks, scratches and other coating defects tend to occur. This limits the degree to which the solid content of the coating material can be increased, and as a result it becomes necessary to enhance the drying condition, which increases the cost while affecting paper quality by reducing sheet gloss.

The use of organic pigments, such as plastic pigments, is another method known to increase sheet gloss, prevent missing dots and add favorable characteristics such as opacity (Japanese Patent Application Laid-open No. 64-20396). However, organic pigments are more expensive than inorganic pigments, resulting in higher costs. Also, organic pigments tend to make the coating mixture more viscous under high shearing force, just as high-aspect-ratio pigments do, and this high viscosity makes the paper more prone to streaks, scratches and other coating defects.

To improve the cushioning property of a coated paper for gravure printing, generally the mechanical pulp content is maximized. Further, when chemical pulps must be used, varieties containing soft fibers are selected. However, given the increased environmental awareness throughout the public and industry, the use of recycled, deinking pulp is now favored over virgin pulp in both mechanical and chemical pulp applications. Therefore, at present it is somewhat difficult to obtain virgin mechanical pulps offering a sufficient amount of cushioning. With chemical pulp it has also become difficult to selectively source high-grade wood materials from which flexible fibers can be obtained, or to procure chemical pulp made from such high-grade wood materials.

Given the background explained above, there has been a need to develop coated gravure papers that provide favorable gravure printability in a manner not dependent upon the types and blending ratios of coating pigments and pulps used.

SUMMARY OF THE INVENTION

In consideration of the aforementioned need, the present invention aims to provide a coated paper for gravure printing that ensures a reduction in missing dots and offers higher sheet gloss.

The inventors have carried out extensive studies in order to identify ways of achieving the above objective, and have found that when producing a coated paper for gravure printing consisting of a base paper and a coating layer containing pigment and adhesive, the addition of certain organic chemicals limits the generation of speckles during gravure printing and increases sheet gloss after calendering. This finding has led to the invention presented here. In other words, the present invention is a coated paper for gravure printing produced by adding to the material mixture of the base paper an organic compound or compounds having the effect of inhibiting the binding between pulp fibers. The organic compounds having the effect of inhibiting the binding between pulp fibers, which can be used in the present invention, may be selected using the test specified below.

This test uses a pulp slurry of the target paper consisting of 100 weight-parts of bone-dry pulp and 0.3 weight-part of the testing organic compound. The mixture is made into paper using an oriented test paper machine (by Kumagai Riki) operating at a speed of 900 rpm. The paper thus obtained is pressed and dried in accordance with the methods specified in JIS 8209.

In the test conducted by the inventors, a fan dryer was used to dry the paper at 50° C. for one hour. The test paper thus obtained was left in a temperature-controlled environment of 23° C. and a relative humidity of 50% for 24 hours, after which the tensile strength of the paper was measured in accordance with JIS P 8113.

The organic compounds having the effect of inhibiting the binding between fibers, as specified in the present invention, are those chemicals that reduce the paper's tensile strength. A compound that doesn't significantly reduce the tensile strength is less effective at reducing speckles and must therefore be added in relatively greater volume. A compound that substantially reduces the tensile strength can effectively reduce missing dots when used in only a small amount. So, although any organic chemical can be used as long as it reduces the paper's tensile strength, it is preferable to use one that can reduce the tensile strength by five % to 40%, or better yet by 10% to 20%, when added to 0.3% of pulp.

The compounds used in the present invention that have the effect of inhibiting the binding between pulp fibers (hereinafter referred to as "binding inhibitors") have a hydrophobic group and a hydrophilic group, and they act to reduce the tensile strength of the paper in context of the aforementioned test. The currently available density reducers (or bulk-increasing agents), which have been developed in recent years for the purpose of increasing paper bulk, provide a degree of binding inhibition suitable to the requirements of the present invention. These include high-grade alcohol containing ethylene and/or propylene oxide, a polyhydric alcohol type of nonionic surface-active agent, high-grade fatty acid containing ethylene oxide, ester compound of polyhydric alcohol and fatty acid, ester compound of polyhydric alcohol and fatty acid containing ethylene oxide, and fatty polyamide amine, the details of which are found in WO patent application No. 98/03730, Japanese Patent Application Laid-open Nos. 11-200284 and 11-350380, etc. The commercially available bulk-increasing chemicals include Sursol VL by BASF, Bayvolum P Liquid by Bayer, KB-08T, 08W, KB110 and KB115 by Kao, and Reactopaque by Sansho. These chemicals may be used alone or in combination.

These binding inhibitors are not known to provide the effect of reducing speckles on gravure printing papers. The reason is not clear, but the following explanation offers a reasonable answer:

The aforementioned bulk-increasing agents or density reducers, when added to the paper material mixture as binding inhibitors, decrease the density of the paper while increasing its bulk. However, papers for gravure printing undergo a super-calendering process to achieve a high degree of smoothness, so the resulting papers have neither higher bulk nor lower density. Nonetheless, because the binding inhibitors partially sever the bindings between pulp fibers and allow the fibers to move freely, when printing pressure is applied to the paper for gravure printing during super-calendering the fibers move in response to the pressure and the coated paper surface adheres more closely to the surface of the cylinder. This is believed to be the reason for higher surface smoothness after calendering, as well as the improved sheet gloss and gravure printability. In addition, when pressure is applied during gravure printing, the fibers also move in accordance with the pressure and the paper adheres more closely to the photogravure cylinder, thus improving the transfer of ink from the grooves in the cylinder. This is probably the reason for reduced missing dots.

Regarding the paper for gravure printing provided through the present invention, the amount of missing dots decreases when a binding inhibitor or inhibitors such as the chemicals explained above are added to 0.01 to 10 weight-%, or better yet 0.2 to 1.5 weight-%, of the bone-dry weight of the pulp comprising the paper for gravure printing. An excessive increase in the content of binding inhibitor will overly inhibit the binding between fibers, resulting in torn paper and other problems.

BEST MODE FOR CARRYING OUT THE INVENTION

The pulps used for making the base paper that comprises the coated paper for gravure, printing provided through the present invention include chemical pulp (bleached or unbleached kraft pulp from softwood, bleached or unbleached kraft pulp from hardwood, etc.), mechanical pulp (groundwood pulp, thermomechanical pulp, chemi-thermomechanical pulp, etc.) and recycled, ink-removed pulp, which may be used alone or in combination at arbitrary blending ratios.

The base paper of the coated paper provided through the present invention may have a pH level that is in the acid, neutral or alkali range. It may use known fillers such as kaoline, talc, hydrated silicic acid, white carbon, calcium carbonate, titanium oxide or synthetic resin fillers.

Furthermore, the base paper of the coated paper provided through the present invention may contain, if necessary, aluminum sulfate, sizing agent, paper strength enhancer, retention-aiding agent, coloring agent, dye, defoaming agent and so on, in addition to the pulp-fiber binding inhibitor.

The base paper of the coated paper can be made by processing a prepared paper slurry on a Fourdrinier paper machine equipped with top wire, etc., a cylinder paper machine, a board machine combining the aforementioned two, a Yankee dryer machine, and so on. The base paper thus obtained may also be pre-coated with starch, polyvinyl alcohol or other material using a sizing press, gate-roll coater or premetering sizing press. Ideally, the grammage of the base paper should be 30 to 200 g/m$^2$.

Next, the coating composition used in the present invention is explained. There are no restrictions regarding the types of pigments used in the coating mixture, and those materials that have traditionally been used in the production of coated paper may be employed. They include inorganic pigments such as kaoline, clay, delaminated clay, ground calcium carbonate, precipitated calcium carbonate, talc, titanium dioxide, barium sulfide, calcium sulfide, zinc oxide, silicic acid, silicate, colloidal silica and satin white, as well as organic pigments such as plastic pigments, all of which may be used alone or in combination.

The present invention uses one or more adhesives chosen from among the various latex and water-based adhesives. One or more of the following latex adhesives may be selected and used as appropriate: conjugated diene copolymer latex types such as styrene butadiene copolymer and methacrylate butadiene copolymer; vinyl polymer latex types such as ester acrylate and ester methacrylate polymer or copolymer; alkali-soluble, alkali-swollen or alkali-insoluble copolymer latex made by modifying each of the aforementioned polymer latex types through use of carboxylate, etc.; or various synthetic resin polymers commonly referred to as binder pigments. When a copolymer latex is used alone or in combination with other latex types, the glass transition point should ideally be between −50 and 0° C. If the glass transition point exceeds 0° C., the coating layer becomes harder and the cushioning property decreases, resulting in the generation of more speckles. If the glass transition point is below −50° C., the latex becomes stickier, thus dirtying the rollers during calendering and causing blocking in the rolling process.

Looking beyond latex adhesives, one or more water-based adhesives may be selected and used as appropriate. They include regular adhesives used for coating applications, including: proteins such as casein, soybean protein and synthetic protein; synthetic-resin adhesives such as polyvinyl alcohol, olefin/nonhydrate maleic-acid resin and melamine resin; starches such as oxidized starch, cationic starch, urea-phosphate esterified starch, hydroxyethyl ether starch or other etherified starch, and dextrin; and cellulose derivatives such as carboxymethyl cellulose, hydroxyethyl cellulose and hydroxymethyl cellulose. The content of solid adhesive should ideally be three to 10 weight-parts per 100 weight-parts of pigment. If the adhesive content is less than three weight-parts, the surface strength decreases to a problematic level. If the content is higher than 10 weight-parts, the resultant harder coating layer increases the generation of missing dots and reduces gravure printability. Among other adhesive materials, starch is used to improve water retention in addition to ensuring adhesion. However, starch also limits cushioning. Therefore, its content should be limited to three or less parts per 100 weight-parts of pigment.

Other additives that may be mixed as necessary include dispersant, thickener, water-retention agent, defoaming agent, waterproofing agent, coloring agent and various other additives mixed into regular pigments for use in the production of coated paper.

The prepared coating mixture is applied to both sides of the base paper in one, two or more layers using a blade coater, bar coater, roll coater, air-knife coater, reverse roll coater, curtain coater, size press coater, gate-roll coater, and so on. The present invention identifies an ideal coating weight to be 3 to 25 g/m$^2$ per side, or better yet 6 to 20 g/m$^2$ per side.

The wet coating layer may be dried in a steam-heated cylinder, hot-air heater/dryer, gas heater/dryer, electric heater/dryer, infrared heater/dryer or high-frequency heater/dryer, which may be used alone or in combination.

The coated and dried paper is then smoothened in a super-calendering, soft-calendering or other process, thereby obtaining a coated paper for gravure printing.

EXAMPLES

The following is a detailed explanation of the present invention using examples. However, the invention is not limited to the examples provided. Unless otherwise specified, "part(s)" and "%" in the examples indicate weight-part(s) and weight-%, respectively.

The coated papers for gravure printing obtained in the examples were tested under the evaluation method specified below.

(Sheet gloss) Measured in accordance with JIS P 8142.

(Missing dots) Each coated paper was printed on using a photogravure press of the type employed by the Ministry of Finance, operated at a printing speed of 40 m/minute and under a printing pressure of 10 kgf/cm. The missing dots on the printed paper were evaluated by visually counting the number of missing dots in a 15-% half-tone area.

[Selection of Binding Inhibitors] Paper material was prepared by combining a one-% slurry, comprising 30 parts of NBKP and 70 parts of refiner groundwood pulp (RGP), with 0.3 part of each of the chemicals specified below. Next, the paper material thus obtained was made into paper using an oriented test paper machine by Kumagai Riki operating at a speed of 900 rpm, and was then pressed and dried in accordance with the methods specified in JIS 8209. The paper was dried using a fan dryer at 50° C. for one hour to obtain a test paper. The test paper thus obtained was then left at a temperature of 23° C. and relative humidity of 50% for 24 hours, after which the tensile strength of the paper was measured in accordance with JIS P 8113. The measured results are shown in Table 1.

TABLE 1

| Evaluated chemical | Tensile strength (kN/m) | Drop in tensile strength (%) | Suitability as binding inhibitor |
|---|---|---|---|
| KB-08W (Kao) | 1.53 | 13.7 | ○ |
| KB-110 (Kao) | 1.50 | 14.8 | ○ |
| Sursol VL (BASF) | 1.56 | 9.8 | ○ |
| Bayvolum P Liquid (Bayer) | 1.59 | 9.7 | ○ |
| Reactopaque (Sansho) | 1.63 | 7.4 | ○ |
| Isopropyl alcohol | 1.73 | 1.7 | Δ |
| Starch | 1.85 | −5.1 | X |
| Casein | 1.89 | −7.4 | X |
| Polyethylene glycol | 1.73 | 1.7 | Δ |
| Oleic acid | 1.66 | 5.7 | Δ |
| Polyacrylic amide | 2.00 | −13.6 | X |
| No substance added | 1.76 | — | — |

The above test indicated that the chemicals that reduce the tensile strength of paper by 6% or more are suitable for the purpose of the present invention, and that those resulting in a strength reduction of 10% or more are particularly suitable.

Next, Kao KB110 and BASF Sursol VL—two chemicals that exhibited particularly favorable binding inhibition properties in the above test—were used to produce coated papers for gravure printing, and each paper was evaluated for improvement with regard to missing dots.

Example 1

WA paper material mixture was prepared by combining 100 parts of LBKP with precipitated calcium carbonate added as a filler to 15% of the bone-dry weight of pulp, to which KB-110 (by Kao) was further added as a binding inhibitor to 0.5% of the bone-dry weight of pulp. The mixture was then made into a base paper with a grammage of 64 g/m$^2$. On the other hand, a coating pigment mixture was prepared from 20 parts of fine-grain ground calcium carbonate (FMT-90, by FIMATEC), 10 parts of fine-grain clay (AMAZON, by CADAM), 50 parts of # 2 clay (Hydrasperse, by Huber) and 20 parts of delaminated clay (Nuclay, by Engelhard), with sodium polyacrylate added to 0.2 part of the total pigment weight as a dispersant. The coating pigment mixture was dispersed using a Cellier's mixer to obtain a pigment slurry with a solid content of 70%. The slurry was further mixed with 0.2 part of unassociated acrylic-based synthetic water retaining agent, six parts of styrene butadiene copolymer latex for gravure printing (glass transition point −40° C.) and some water to prepare a coating mixture with a solid content of 63%. The coating mixture thus obtained was then applied to both sides of the paper to a coating weight of 12 g/m$^2$ using a blade coater operating at a coating speed of 500 m/minute.

[Calendering] Super-calendering was performed using two nips at a roller temperature of 65° C., calender line pressure of 150 kg/cm and paper feed speed of 10 m/minute to obtain a coated paper for gravure printing.

Example 2

A coated paper was obtained in the same manner as described in Example 1, except that KB-110 (by Kao) was added as a binding inhibitor to 0.3% of the bone-dry weight of pulp.

Comparative Example 1

A coated paper was obtained in the same manner as described in Example 1, except that no binding inhibitor was added.

Example 3

A coated paper was obtained in the same manner as described in Example 1, except that the base paper was prepared from 10 parts of LBKP, 10 parts of NBKP, 50 parts of refiner groundwood pulp (RGP) and 30 parts of DIP mixed together as the paper pulp, to which Indonesian kaoline and KB-110 (by Kao) were added as a filler and binding inhibitor, respectively, to 12% (kaoline) and 0.5% (KB-110) of the bone-dry weight of pulp, in order to obtain a paper with a grammage of 51 g/m$^2$.

Example 4

A coated paper was obtained in the same manner as described in Example 3, except that Sursol VL (by BASF) was added as a binding inhibitor to 0.5% of the bone-dry weight of pulp.

Comparative Example 2

A coated paper was obtained in the same manner as described in Example 3, except that no binding inhibitor was added.

The results of the above examples are shown in tables 2 and 3.

TABLE 2

| | | Example 1 | Example 2 | Comparative example 1 |
|---|---|---|---|---|
| Pulp mixture | NBKP | — | — | — |
| | LBKP | 100 | 100 | 100 |
| | RGP | — | — | — |
| | DIP | — | — | — |
| Binding inhibitor content (%) | Kao KB110 | 0.5 | 0.3 | — |
| | BASF Sursol VL | — | — | — |
| Sheet gloss (%) | | 68.7 | 66.8 | 64.4 |
| Missing dots (count) | | 25 | 42 | 74 |

TABLE 3

| | | Example 3 | Example 4 | Comparative example 2 |
|---|---|---|---|---|
| Pulp mixture | NBKP | 10 | 10 | 10 |
| | LBKP | 10 | 10 | 10 |
| | RGP | 50 | 50 | 50 |
| | DIP | 30 | 30 | 30 |
| Binding inhibitor content (%) | Kao KB110 | 0.5 | — | — |
| | BASF Sursol VL | — | 0.5 | — |
| Sheet gloss (%) | | 63.2 | 61.8 | 58.9 |
| Missing dots (count) | | 37 | 64 | 93 |

INDUSTRIAL FIELD OF APPLICATION

The present invention allows for the production of a coated paper for gravure printing that offers good gravure printability resulting from reduced missing dots while at the same time achieving high sheet gloss.

What is claimed is:

1. A coated paper for gravure printing comprising a base paper containing a compound having an effect of inhibiting the binding between pulp fibers, and a coating layer containing a pigment and an adhesive, wherein the tensile strength of said paper is reduced by 5 to 40% as measured when adding 0.3 weight-part of said compound having an effect of inhibiting the binding between pulp fibers per 100 parts of bone-dry pulp.

2. A coated paper for gravure printing comprising a base paper containing a compound having an effect of inhibiting the binding between pulp fibers, and a coating layer containing a pigment and an adhesive, wherein said paper contains 3 to 10 weight-parts of said adhesive per 100 parts of said pigment.

3. The coated paper for gravure printing as described in claim 1, wherein said paper contains 3 to 10 weight-parts of said adhesive per 100 parts of said pigment.

4. A coated paper for gravure printing comprising a base paper containing a compound having an effect of inhibiting the binding between pulp fibers, and a coating layer containing a pigment and an adhesive, wherein said compound is selected from the group consisting of a high-grade alcohol containing ethylene and/or propylene oxide, a polyhydric-alcohol type of nonionic surfactant, a high-grade fatty acid containing ethylene oxide, an ester compound of polyhydric alcohol and fatty acid, an ester compound of polyhydric alcohol and fatty acid containing ethylene oxide, and fatty polyamide amine.

5. A coated paper for gravure printing comprising a base paper containing a compound having an effect of inhibiting the binding between pulp fibers, and a coating layer containing a pigment and an adhesive, wherein the tensile strength of said paper is reduced by 10 to 20 % by adding 0.3 weight-part of said compound having an effect of inhibiting the binding between pulp fibers per 100 parts of bone-dry pulp.

6. A coated paper for gravure printing comprising a base paper containing a compound having an effect of inhibiting the binding between pulp fiber, and a coating layer containing a pigment and an adhesive, wherein the content of said compound is 0.01 to 10 weight % relative to a bone-dry weight of pulp included in said paper.

7. The coated paper for gravure printing as described in claim 6, wherein the content of said compound is 0.2 to 1.5 weight % relative to a bone-dry weight of pulp included in said paper.

8. The coated paper for gravure printing as described in claim 1, wherein said compound is selected from the group consisting of a high-grade alcohol containing ethylene and/or propylene oxide, a polyhydric-alcohol type of nonionic surfactant, a high-grade fatty acid containing ethylene oxide, an ester compound of polyhydric alcohol and fatty acid, an ester compound of polyhydric alcohol and fatty acid containing ethylene oxide, and fatty polyamide amine.

9. The coated paper for gravure printing as described in claim 1, wherein the content of said compound is 0.01 to 10 weight % relative to a bone-dry weight of pulp included in said paper.

10. The coated paper for gravure printing as described in claim 2, wherein said compound is selected from the group consisting of a high-grade alcohol containing ethylene and/or propylene oxide, a polyhydric-alcohol type of nonionic surfactant, a high-grade fatty acid containing ethylene oxide, an ester compound of polyhydric alcohol and fatty acid, an ester compound of polyhydric alcohol and fatty acid containing ethylene oxide, and fatty polyamide amine.

11. The coated paper for gravure printing as described in claim 2, wherein the content of said compound is 0.01 to 10 weight % relative to a bone-dry weight of pulp included in said paper.

12. The coated paper for gravure printing as described in claim 5, wherein said compound is selected from the group consisting of a high-grade alcohol containing ethylene and/or propylene oxide, a polyhydric-alcohol type of nonionic surfactant, a high-grade fatty acid containing ethylene oxide, an ester compound of polyhydric alcohol and fatty acid, an ester compound of polyhydric alcohol and fatty acid containing ethylene oxide, and fatty polyamide amine.

13. The coated paper for gravure printing as described in claim 5, wherein the content of said compound is 0.01 to 10 weight % relative to a bone-dry weight of pulp included in said paper.

* * * * *